No. 779,870. PATENTED JAN. 10, 1905.
D. ROBERTSON.
CULTIVATOR FOR TREES.
APPLICATION FILED AUG. 15, 1904.

WITNESSES:
P. B. Jones
A. M. McRae

INVENTOR.
Donald Robertson
BY Ridout and Maybee
ATTORNEYS

No. 779,870. Patented January 10, 1905.

UNITED STATES PATENT OFFICE.

DONALD ROBERTSON, OF WINDSOR, NEW SOUTH WALES, AUSTRALIA.

CULTIVATOR FOR TREES.

SPECIFICATION forming part of Letters Patent No. 779,870, dated January 10, 1905.

Application filed August 15, 1904. Serial No. 220,844.

*To all whom it may concern:*

Be it known that I, DONALD ROBERTSON, blacksmith, of Windsor, in the State of New South Wales and Commonwealth of Australia, have invented certain new and useful Improvements in Cultivators for Trees, of which the following is a specification.

The object of the invention is to provide means for readily and efficiently working or cultivating to the desired depth the ground about the trunks of trees by horse or draft-animal power, and is specially intended to provide an implement whereby the earth or soil may be worked immediately surrounding fruit-trees of small size where the lower branches are near the ground and which would otherwise interfere with the movements of the animal; and it consists, essentially, in a hinged hub-like device adapted to encircle the lower part of the trunk of the tree and afford a bearing for a detachable connection to the inner end of the cultivator-frame, which is preferably provided with a double set or series of cultivator-teeth, means being also provided for regulating the depth of tillage and for supporting in operative position the outer end of the cultivator and for attaching to such outer end the draft-animal, who can thus give circular motion to the cultivator-teeth around the stem or trunk of the tree without being in any wise interfered with or impeded by the branches.

Figure 1:
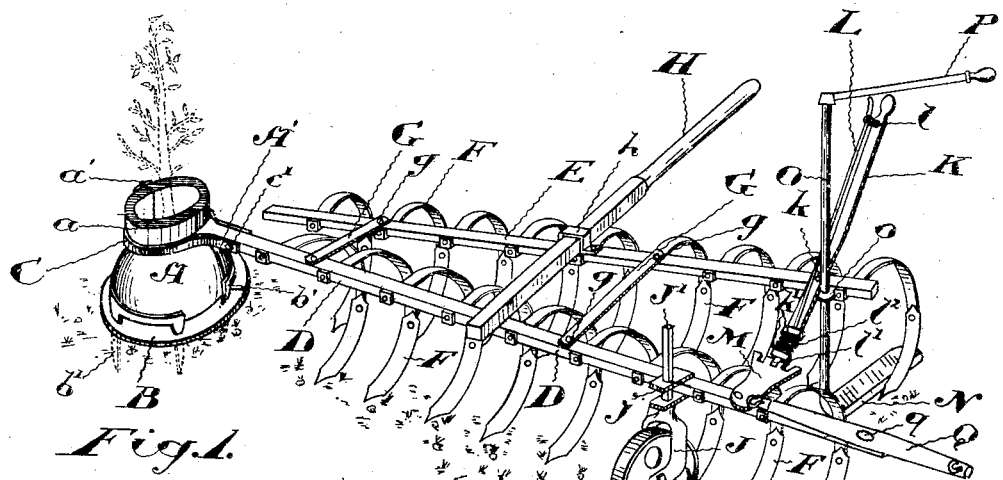
Figure 2:
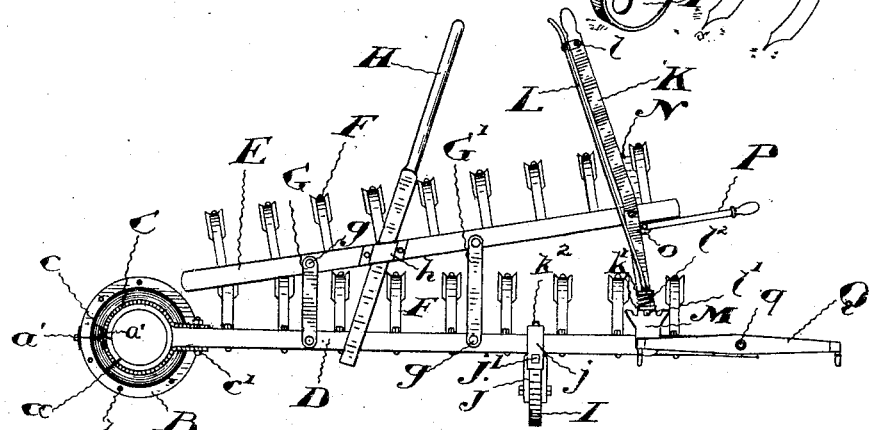
Figure 3:
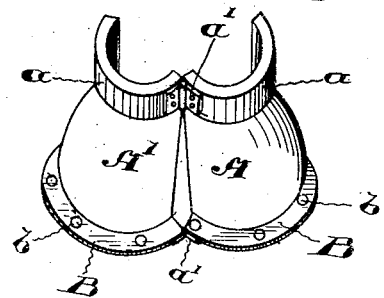

Figure 1 is a perspective view of my tree-cultivator in operative position to effect a circular turning up of the soil with the tree as the center. Fig. 2 is a plan view of the tree-cultivator shown in Fig. 1. Fig. 3 is a detail of the hinged dome-shaped hub designed to encircle the trunk of the tree and be secured to the ground.

Like letters indicate similar parts in the different figures.

A A' is a dome-shaped hub-like device formed in two parts, as indicated specially in Fig. 3, and provided with a collar $a$ and hinges $a'$, so as to permit of the device opening up, as shown in Fig. 3, so as to be placed around the stem or trunk of a tree when in operative position.

B is a flange formed at the bottom of said device, provided with holes $b$ to receive the pins $b'$ for the purpose of fastening the hub-like device onto the ground after it has encircled the tree. These pins $b'$ may be connected together by a bar, as indicated in Fig. 1, or may be separate pins, as desired.

C is a circular band hinged at $c$, so as to enable it to be placed on the collar $a$ of the hub-like device, and finds a bearing on the top of the dome-shaped device when in operative position. This circular band is detachably secured to one end of the front tooth-bearing bar D by means of a bolt $c'$ or may be detachably secured to this bar in any other desired manner. E is a rear tooth-bearing bar placed somewhat diagonally to the front bearing-bar, as particularly indicated in the plan view, Fig. 2. To these front and rear bars are attached in the usual manner the cultivator-teeth F. These two tooth-bearing bars are pivotally connected to each other by means of the links G G', which are pivoted to the bars at $g$, as indicated. In order to give a diagonal set to the rear bar, these links G G' are different lengths, as indicated. By this construction the teeth assume the set shown in Fig. 2 and are specially adapted for the circular or rotary motion which is given to them when the tree-cultivator is in operation.

H is a removable handle secured to the rear tooth-bearing bar by means of the socket $h$. This handle is adapted for use when it is desired to raise the teeth out of the ground or when moving the cultivator from one tree to another and also when giving lateral shift to the rear bar for the purpose of altering the position of the cultivator-teeth thereon with respect to the front set of teeth.

I is a wheel attached to the front tooth-bearing bar near its outer or free end. It is journaled on the forks J, which are provided with the stem J', which passes through the clip $j$, rigidly attached to the front tooth-bearing bar.

$k^2$ (shown in Fig. 2) is a pinch-nut which engages against the stem J', and by manipulating this bolt the height of the front tooth-bearing bar above the ground may be regulated, so as to give a greater or less depth of entrance of the teeth into the ground, as may be desired.

K is an upwardly-curved adjusting-handle which is pivoted at *k* near the free end of the rear tooth-bearing bar. It is provided with guides *k'* at its lower end and also with the pivoted arm L, which is pivoted at *l* to the end of the handle in the usual manner. The lower end of this pivoted arm L passes through the guides *k'* and has at its end a dog *l'*, designed to engage with the tooth-detent M.

$l^2$ is a spring adapted to keep the dog *l'* normally engaged with the tooth-detent.

N is a runner attached to the vertically-disposed stem O, which is adjustably fastened to the outer free end of the rear tooth-bearing bar by the fastener *o*. This stem is provided with the handle P.

Q is the whiffletree, pivotally secured to the outer or free end of the front tooth-bearing bar by the pivot-bolt *q*. To this whiffletree the horse or other draft-animal is attached. It will thus be seen that as the teeth-bearing bars may be made eight or ten feet in length the draft-animal will be able to move in a circular direction around the tree without being interfered with in any way by the branches of the tree. When the horse draws the device around, the teeth move in circles about the tree as the circular band on the collar travels around the dome-shaped hub-like device which encircles the tree.

By manipulating the spring-dog *l'* in the usual manner the dog may be disengaged from the tooth in the detent and the rear tooth-bearing bar may be shifted either right or left, as may be desired, so as to more perfectly harrow up and turn over the soil which surrounds the tree-trunk. In laterally adjusting the rear tooth-bearing bar the centrally-disposed handle H, as well as the handle P, may be utilized after the dog has been removed from the tooth in the detent. When the rear bar has been moved into the desired position, the dog is allowed to engage with the tooth in the detent in the usual manner.

What I claim as my invention is—

1. In a cultivator for trees the combination of a hub-like device for encircling the trunk of a tree; means for detachably and revolubly securing one end of the cultivator-frame to the hub-like device; a front bar; cultivator-teeth secured to said front bar; a wheel adapted to adjustably support the free end of the front bar; a rear bar; and cultivator-teeth secured to said rear bar; a pivoted link connection between the front and rear bars; and a runner adjustably secured to the free end of the rear bar, substantially as described.

2. In a cultivator for trees the combination of a hub-like device for encircling the trunk of a tree; means for detachably and revolubly securing one end of the cultivator-frame to the hub-like device; a front bar; cultivator-teeth secured to said front bar; a wheel adapted to adjustably support the free end of the front bar; a whiffletree pivotally secured to the free end of the front bar; a rear bar set diagonally to the front bar; and cultivator-teeth secured to said rear bar; a pivoted link connection between the front and rear bars; and a runner adjustably secured to the free end of the rear bar, substantially as described.

3. In a cultivator for trees the combination of a hinged hub-like device for encircling the trunk of a tree; a flange on said device adapted to be pinned to the earth; a collar formed on said device; a circular band movable on said collar; a front bar detachably secured at one end to said circular band; cultivator-teeth secured to said front bar; a wheel adapted to adjustably support the free end of the front bar; a whiffletree pivotally secured at the free end of the front bar; a rear bar and cultivator-teeth secured to said rear bar; a pivoted link connection between the front and rear bars; and a runner adjustably secured to the free end of the rear bar, substantially as specified.

4. In a cultivator for trees the combination of a hinged hub-like device for encircling the trunk of a tree; a flange on said device adapted to be pinned to the earth; a collar formed on said device; a circular band movable on said collar; a front bar detachably secured at one end to said circular band; cultivator-teeth secured to said front bar; a wheel adapted to adjustably support the free end of the front bar; a whiffletree pivotally secured at the free end of the front bar; a rear bar and cultivator-teeth secured to said rear bar; a pivoted link connection between the front and rear bars, giving a diagonal or converging set to the said bars; means for giving lateral adjustment to the rear tooth-bearing bar; and a runner adjustably secured to the free end of the rear bar, substantially as specified.

5. In a cultivator for trees the combination of a hinged hub-like device for encircling the trunk of a tree; a flange on said device adapted to be pinned to the earth; a collar formed on said device; a circular band movable on said collar; a front bar detachably secured at one end to said circular band; cultivator-teeth secured to said front bar; a wheel adapted to adjustably support the free end of the front tooth-bearing bar; a whiffletree pivotally secured at the free end of said front bar; a toothed detent fixed near said free end; a rear bar and cultivator-teeth secured to said rear bar; a plurality of pivoted links connecting the front and rear bars, giving a diagonal or converging set to said bars; a centrally-disposed handle removably secured to the rear bar and bearing on the front bar; a runner attached to a vertically-disposed stem provided with a handle, and adjustably secured to the free end of the rear bar; a laterally-adjusting handle, pivotally attached near the free end of the rear bar; a spring-dog device pivotally secured to said handle, and adapted to engage with the toothed detent on the front tooth-bearing bar, substantially as specified.

Toronto, August 9, 1904.

DONALD ROBERTSON.

In presence of—
 J. EDW. MAYBEE,
 P. R. JONES.